March 28, 1939. H. G. MEAD 2,151,928
APPARATUS FOR MEASURING TEMPERATURE
Filed July 31, 1935
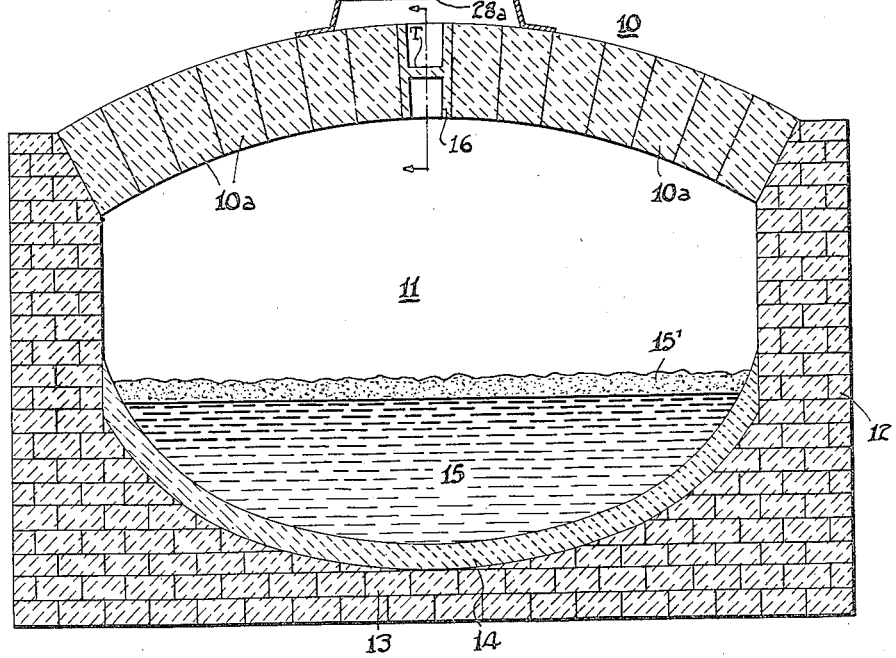
INVENTOR.
Harold G. Mead Patented Mar. 28, 1939

2,151,928

UNITED STATES PATENT OFFICE 2,151,928

APPARATUS FOR MEASURING TEMPERATURE

Harold G. Mead, Wynnewood, Pa., assignor to Leeds & Northrup Company, Philadelphia, Pa., a corporation of Pennsylvania Application July 31, 1935, Serial No. 34,118

1 Claim. (Cl. 136—4)

My invention relates to systems for measuring the temperature of the inside face of a refractory wall structure and particularly of the temperature of the inside face of the refractory roof structure of an open-hearth furnace.

In accordance with one aspect of my invention, a portion, block or element of the refractory wall or roof structure of a furnace is provided with a recess closed by a target section, substantially removed from the inside surface of the block, and a radiation pyrometer, disposed externally of the furnace, is sighted or focused through the recess upon, or receives radiation through the recess directly from, the radiation-emitting surface of the target.

In accordance with another aspect of my invention, there is combined with the radiation pyrometer a measuring network which compensates for the difference between the temperature of the inner face of said wall or roof structure and the temperature of the radiation-emitting surface of the target, thereby giving directly the temperature of said inner face of wall or roof.

My invention further resides in the features of construction, combination and arrangement hereinafter described and claimed.

For an understanding of my invention, reference is made to the accompanying drawing in which:

Figure 1 illustrates the application of my invention to measurement of temperature of the inside face of the roof structure of an open hearth furnace, shown in section.

Fig. 2 is a cross-sectional view of a modified form of refractory block suitable for use in accordance with certain aspects of my invention;

Fig. 3 is a detail view of the thermo-electric element of a radiation pyrometer particularly suited for use in connection with my invention.

This application is a continuation-in-part of my co-pending application Serial No. 750,521, filed October 29, 1934.

It is well-known that certain refractory wall structures are progressively destroyed in use, particularly the roof structure of an open-hearth furnace subjected directly to the flames and hot combustion gases utilized in heating or reducing the melt. The rate of progressive destruction of the roof structure may be decelerated to a considerable extent by maintaining its temperature below a predetermined limit dependent upon the refractory composition of the roof structure. Under normal operating conditions, it is not possible directly to measure the temperature of the roof of such a furnace because of the effect upon any measuring apparatus of the flame interposed between a point of observation and the roof, together with reflected radiation from other portions of the furnace chamber. On the other hand, it is highly desirable to obtain intermittent or continuous measurements of the temperature of the furnace roof to prevent an excessive rise above safe operating temperatures.

However, I have found that, with the apparatus hereinafter described, it is possible to measure a temperature which is representative of the actual temperature of the inside face of the roof structure. The apparatus used to measure this temperature may be calibrated by a single direct measurement of the roof temperature under predetermined conditions; for example, when the heating flame is temporarily shut off. Such a measurement may be taken through an opening in the wall of the furnace by means of an optical or radiation pyrometer or other suitable well-known apparatus. By measuring the temperature of the target section in the refractory block or element under corresponding conditions, the measuring apparatus may be calibrated to read directly the desired roof temperature. By the term "continuous measurement", as used hereinafter, is meant to include any measurement, indication, record or controlling effect obtained intermittently, continuously, or at will during normal operation of the furnace, as contrasted with single calibrating measurements taken under restricted conditions, as in the absence of the heating flame.

Referring now more particularly to Fig. 1 of the drawing, there is illustrated an apparatus embodying my invention for measuring the temperature of the inside face of the roof structure 10 of an open-hearth furnace 11, shown in cross-section. The furnace 11 comprises side and bottom wall structure 12 built up of fire bricks or any other well-known refractory composition suitable for withstanding the temperatures involved. The wall structure 12 defines a heating or treating receptacle 13 which may be lined with a suitable highly refractory lining 14 resistant to corrosion by the molten bath 15 contained therein. A layer of slag 15' generally forms over the molten bath 15. The roof structure 10 is preferably built up of a plurality of refractory blocks or elements 10a and there is provided a refractory block 16 which may be of any suitable shape or dimension, but is preferably of such a size as to be interchangeable with one or more of the blocks 10a. The block 16 preferably is composed of material having a thermal conductivity substantially higher than that of the blocks 10a.

The target section T within the recess of the hollow block 16 is thin compared to the depth of the block or of the roof structure of which it forms a part.

The temperature of the target section which varies as a function of the temperature to which the inside of the wall structure is exposed is measured by a radiation pyrometer, such as represented at 17 in Fig. 1 of the drawing. The pyrometer 17 may rest upon a suitable framework 18 supported above the roof structure 10 and is sighted or focused upon the upper or radiation-emitting surface of target section T.

The pyrometer 17 which, per se, forms no part of my invention, may comprise an elongated tubular member 19 in which are mounted a plurality of annular diaphragms 20 for substantially eliminating side reflection from the walls of the tube. The upper end of the tube 19 terminates in a tube or housing 21 in which is supported a reflector 22 which focuses the rays received through the tube 19 on to a thermo-electric element 23. This thermo-electric element may be of any of the well-known types, although I have shown in Fig. 3 a detail view of one thermo-electric element particularly suitable for use in connection with my invention. This comprises a series of thermocouples 24 supported at 24a, by means of radial tension members 25, from an annular ring 26. The hot junctions of the thermocouples 24 are affixed to a common absorption plate such, for example, as a small platinum disk 24b, upon which is focused the radiation from the tube 19 by means of the mirror 22. The cold junctions 24c of the thermocouples 24 are substantially displaced from the absorption disk 24b. The thermocouples 24 are connected in series and the end connections of this series are connected to the terminals 27 at which the electromotive force developed by the pyrometer may be measured by any suitable apparatus. A lower shielding plate 28 of the support 18 is provided with a longitudinal slot 28a registering with the open end of the pyrometer tube 19 as it is moved in the slot 18a.

Since the thermocouples are substantially removed from the furnace, there is no danger of their burning out when the furnace is hottest and information of the temperature most essential, a fault of prior arrangements in which the thermocouple or equivalent temperature-responsive element is disposed within or extends through the furnace wall.

As stated above, the electromotive force developed by the radiation pyrometer may be measured by any suitable apparatus, although I have found the potentiometer circuit disclosed and claimed in United States Letters Patent No. 2,003,681, granted June 4, 1935, upon the application of E. D. Doyle, particularly suitable for the measurement of this electromotive force. In brief, such a measuring circuit 29 comprises a split-circuit potentiometer one arm of which is made up of a fixed resistance 30 and the other arm of which consists of a fixed or adjustable resistance 31 and an adjustable resistance, such as a slidewire 32, with which is associated a scale 32a. One end of a branch of the potentiometer is connected to the corresponding end of the other branch, while the other two ends of the branches are interconnected through a resistance 33 having an adjustable contact 34. The potentiometer circuit is energized from any suitable source of current, such as a battery 35, through a calibrating resistance 36 provided with adjustable contact 37 and a fixed resistance 38, the connections being made at the adjustable contact 34 and the other terminal common to the two branches of the potentiometer circuit. A standard cell 39 is adapted to be connected across the fixed resistance 38 through a galvanometer G and a key or switch 40. The terminals 27 of the radiation pyrometer are connected through a suitable measuring or controlling device G' to adjustable contacts 41 and 42 cooperating with the resistance 31 and the slidewire 32, respectively.

In the operation of the above-described apparatus, it will be assumed that the furnace 11 has been in operation sufficiently long to reach approximately a condition of equilibrium and that the source of combustion products (not shown) is turned off. Under these conditions, the radiation pyrometer 17 is sighted upon, receives radiation from, the upper or radiation-emitting surface of target T within the refractory block or element 16 and the electromotive force developed by the thermo-electric element 23 is impressed upon the terminals 27 and is balanced against the electromotive force between the contacts 41 and 42 of the potentiometer circuit 29 by adjusting the contact 42, the balanced condition being indicated by null deflection of the galvanometer G'. At about the same time, or at least before the furnace has had time to change conditions substantially, a direct reading of the temperature of the inside face of the roof structure 10a in the region of the block 16 is made by any suitable means, such as an optical pyrometer or a radiation pyrometer; in certain instances, the radiation pyrometer 17 may be used also for this purpose. After this reading has been made, the contact 34 may be adjusted along the resistance 33 to bring the reading of the scale 32a, associated with the slidewire 32 and adjustable contact 42, to the proper value for the given temperature under the measured condition. This particular connection of the battery to the split circuit potentiometer 30—31—32—33 minimizes errors due to change in the total battery current as set forth in detail in the above-mentioned Doyle patent.

I have found that the temperature of the target section T is representative of the temperature of the inside face of the roof structure 10 and the block 16. I have found also that this temperature varies approximately with the temperature of the inside face of the roof structure 10 so that by proper calibration, as described above, subsequent measurements of the temperature of the target section will be a measure of the temperature at the inside face of the roof structure. The accuracy of these measurements may be increased by constructing the block 16 of a refractory substance of relatively high thermal conductivity such, for example, as silicon carbide or a substance known in the trade as "chrome brick". It will also be understood that it is desirable to have the target section of the block 16 as thin as practicable under the conditions of operation.

Since the target section T is substantially spaced from the inside end of the block, it is out of the path of the rapidly moving furnace gases which would otherwise wear it away by erosive action and thereby change the temperature differential between the upper and lower faces of the target section. Since the target section is substantially spaced from the inner end of the block, its temperature is lower than the temperature of the inner face of the roof; however when the network 29 is adjusted as above described, the readings obtained from scale 32a closely approximate the temperatures of the inner face of the roof.

The target section may be an integral part of the block, or it may be a separate element, as in the modification shown in Fig. 2.

In operation of open-hearth furnaces, the operating temperature is almost equal to the destructive point of the roof bricks. By locating the target section T at a substantial distance from the inside face of the roof, its temperature, due to proximity to the cooler portion of the adjacent roof bricks, is substantially less than if it were flush with the inside of the roof. In actual tests, the temperature of the target section T was only 2200° F., whereas the temperature at the inner face of the roof was 2800° F.

A further advantage of the brick 16 shown in Fig. 1 is that the temperature of the target section is a combination of the radiant energy received by the inside of the furnace and the temperature of the adjacent furnace roof structure. Consequently, a maximum temperature of the target section is obtained only by maximum conditions of radiant energy from the furnace, plus maximum conditions of ambient temperature of the roof structure. Since the resultant of these two conditions determines the safe operating limit for the roof structure, the construction shown in Fig. 1 is preferred.

It will be understood that the galvanometer G' is purely representative of any suitable indicating, recording, and/or controlling apparatus. For example, the apparatus is particularly suitable for application to a rebalancing recording mechanism of the type shown in United States Letters Patent No. 1,935,732, granted November 21, 1933, upon the application of L. Y. Squibb, in which the potentiometer slidewire 46 corresponds to the slidewire 32 of the present application, and the galvanometer G corresponds to the galvanometer G' of the present application. The potentiometer circuit 29 may be checked for variations in the voltage of the battery 35, or other source of supply, by closing the switch 40 and adjusting the contact 37 to bring the potentiometer current to a predetermined value to balance the circuit, including the resistance 38, standard cell 39, and the galvanometer G, as is well understood in the art. This recalibration of the potentiometer may also be effected automatically, as in the mechanism of the above-mentioned Squibb patent.

A modified form of refractory element or block is shown in Fig. 2 of the drawing. In Fig. 2, the block 16A contains an exterior recess 43a in the shape of a frustum of a cone. A plurality of cylindrical disks or blocks 43b, 43c and 43d of progressively increasing diameters are provided with the block 43. As the lower face of block 16A forming the target element 43 is progressively destroyed in the operation of the furnace, the target elements 43b, 43c and 43d are successively placed in the recess which is thus repeatedly opened; the radiation pyrometer is, of course, readjusted each time a new target element is inserted. It will also be found desirable, in general, to recalibrate the apparatus at regular intervals to compensate for the gradual destruction of the target element in use. It will be apparent that, if desired, the recess 43a may extend entirely through the block 16A, relying entirely upon the auxiliary target disks to close the recess and constitute a radiant source for the pyrometer.

While I have described what I at present consider the preferred embodiments of my invention, it will be obvious to those skilled in the art that various changes and modifications may be made without departing from my invention, and I, therefore, aim in the appended claim to cover all such changes and modifications as fall within the true spirit and scope of my invention.

What I claim is:

In an apparatus for measuring the temperature of a refractory wall structure, a refractory block for inclusion as a portion of the wall structure provided with a target permanently an integral section of said block and having external and internal recesses defining said target section and through which said section is visible from the exterior and exposed to the interior of the furnace respectively, the thermal conductivity of the refractory of said block being substantially higher than the thermal conductivity of the refractory of said wall structure.

HAROLD G. MEAD.